United States Patent
Fang

(10) Patent No.: US 9,197,400 B1
(45) Date of Patent: Nov. 24, 2015

(54) METHOD AND APPARATUS FOR JOINT ESTIMATION OF CARRIER FREQUENCY OFFSET AND SAMPLING FREQUENCY OFFSET

(71) Applicant: MARVELL INTERNATIONAL LTD., Hamilton (BM)

(72) Inventor: Jing Fang, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 13/898,156

(22) Filed: May 20, 2013

Related U.S. Application Data

(60) Provisional application No. 61/649,852, filed on May 21, 2012.

(51) Int. Cl.
  *H04L 27/06* (2006.01)
  *H04L 7/00* (2006.01)

(52) U.S. Cl.
  CPC .................................... *H04L 7/0079* (2013.01)

(58) Field of Classification Search
  CPC ............ H04L 27/2647; H04L 27/2657; H04L 27/2662; H04L 27/2675; H04L 27/266
  USPC ......... 375/260, 261, 340, 346, 355, 364, 375, 375/148
  See application file for complete search history.

(56) References Cited

U.S. PATENT DOCUMENTS

| | | | | |
|---|---|---|---|---|
| 5,694,389 A | * | 12/1997 | Seki et al. | 370/208 |
| 6,215,819 B1 | * | 4/2001 | Hyakudai et al. | 375/240 |
| 7,940,849 B1 | * | 5/2011 | Fang et al. | 375/260 |
| 2003/0128660 A1 | * | 7/2003 | Ito et al. | 370/210 |
| 2004/0109508 A1 | * | 6/2004 | Jeon et al. | 375/260 |
| 2005/0163094 A1 | * | 7/2005 | Okada et al. | 370/343 |
| 2005/0213680 A1 | | 9/2005 | Atungsiri et al. | |
| 2006/0285599 A1 | | 12/2006 | Seki et al. | |
| 2007/0041312 A1 | | 2/2007 | Kim | |
| 2008/0063012 A1 | * | 3/2008 | Nakao et al. | 370/500 |
| 2009/0092197 A1 | * | 4/2009 | Okamoto et al. | 375/260 |
| 2009/0296862 A1 | * | 12/2009 | Nakaya | 375/343 |
| 2010/0254475 A1 | * | 10/2010 | Kawauchi et al. | 375/267 |
| 2011/0044408 A1 | * | 2/2011 | Ahmad | 375/340 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

(Continued)

*Primary Examiner* — Shuwang Liu
*Assistant Examiner* — Sung Ahn

(57) ABSTRACT

In a method for determining timing information in a receiver, a receiver receives a modulated signal and demodulates the modulated signal using an demodulator to produce a demodulated signal. An analog to digital converter converts the demodulated signal to a digital signal and first and second signals are produced from the digital signal. The first signal is analyzed to determine a first phase difference with respect to different portions of the signal, and the second signal is analyzed to determine a second phase difference with respect to different portions of the second signal. The second signal is a frequency domain representation of at least a portion of the first signal. A joint estimate of a sampling period offset and a carrier frequency offset is generated based on the first phase difference and the second phase difference.

15 Claims, 5 Drawing Sheets

(56) References Cited

OTHER PUBLICATIONS

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

Chen, "Home Network Basis: Transmission Environments and Wired/Wireless Protocols," *Prentice Hall*, pp. 1-26 (Jul. 2003).

Hiertz, et al., "The IEEE 802.11 Universe," IEEE Communications Magazine, pp. 62-70, (Jan. 2010).

\* cited by examiner

METHOD AND APPARATUS FOR JOINT ESTIMATION OF CARRIER FREQUENCY OFFSET AND SAMPLING FREQUENCY OFFSET

CROSS-REFERENCE TO RELATED APPLICATION

The present application claims the benefit of U.S. Provisional Application No. 61/649,852, entitled "A JOINT CARRIER FREQUENCY OFFSET AND SAMPLE FREQUENCY ESTIMATION FOR DVB RECEIVER," filed on May 21, 2012, which is hereby incorporated by reference herein in its entirety.

FIELD OF TECHNOLOGY

The present disclosure relates generally to communication devices, and more particularly, to techniques for estimating a carrier frequency offset and a sampling period offset.

DESCRIPTION OF THE RELATED ART

Orthogonal frequency-division multiplexing (OFDM) is a digital multi-carrier modulation scheme that employs a large number of relatively closely spaced orthogonal sub-carriers. Each sub-carrier is itself modulated with a modulation scheme such as quadrature amplitude modulation, phase shift keying, etc., at a relatively low symbol rate. Even though data on a particular sub-carrier is modulated at a low symbol rate, the large number of sub-carriers provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

Some OFDM systems utilize pilots for synchronization, channel estimation, etc., for example. In these systems, pilot signals may be sent in one more sub-channels. The sub-channels in which a pilot is sent may be the same for each OFDM symbol or it may vary between OFDM symbols.

Some digital video broadcast (DVB) systems, such as the DVB-T (Digital Video Broadcasting—Terrestrial) standard, utilize OFDM. FIG. 1 is a block diagram of a DVB system 100 that utilizes OFDM. The DVB system 100 includes a transmitter 104 and a receiver 108. The transmitter includes a quadrature amplitude modulation (QAM) modulator 120 coupled to an inverse fast Fourier transform (IFFT) block 124. The QAM modulator 120 may comprise $N_V$ parallel QAM modulators and a multiplexer that feeds an information signal s(i) to the $N_V$ parallel modulators. Each of the $N_V$ parallel QAM modulators may generate a modulated signal stream corresponding to one of N sub-carriers, where $N_V$ is typically less than N. In other words, the QAM modulator 120 modulates an information signal s(i) to generate $N_V$ QAM modulated signals.

A set of N signals $X_0(k)$, $X_1(k)$, ..., $X_{N-1}(k)$, which includes the $N_V$ QAM modulated signals and other signals such as pilot signals, transmit parameter signals, etc., and which correspond to the N sub-carriers, are provided to an IFFT block 124. The IFFT block 124 performs an IFFT operation on the set of N modulated signals $X_0(k)$, $X_1(k)$, ..., $X_{N-1}(k)$ to generate a set of N signal samples x(n), x(n+1), ..., x(n+N) that correspond to one OFDM symbol.

The receiver also includes a guard interval inserter 128 coupled to the IFFT block 124. The guard interval inserter 128 inserts a guard interval between OFDM symbols, such as by inserting a guard interval at the beginning of each OFDM symbol. The length of the guard interval is typically some predetermined fraction of the length of the OFDM symbol (e.g., ¼ the OFDM symbol length, ⅛, ¹⁄₁₆, ¹⁄₃₂, etc.). The guard interval may include a cyclic prefix, which is merely a copy of an ending portion of the OFDM symbol. In other words, the guard interval inserter 128 may copy an ending portion of the OFDM symbol, the portion being of some predetermined length G, and position it before the beginning of the OFDM symbol. Thus, upon receiving the set of N signal samples x(n), x(n+1), ..., x(n+N−1), the guard interval inserter 128 may create the sequence x(n+N−G), x(n+N−G+1), ..., x(n+N−1), x(n), x(n+1), ..., x(n+N−1), where the samples x(n+N−G), x(n+N−G+2), ..., x(n+N−1) correspond to the guard interval and the samples x(n), x(n+1), ..., x(n+N−1) correspond to the OFDM symbol.

A digital-to-analog converter (DAC) 132 is coupled to the guard interval inserter 128 and converts the samples x(n) to an analog signal. The sampling period corresponding to the DAC 132 is denoted as T. A radio frequency (RF) modulator 136 is coupled to the DAC 132 and modulates the output of the DAC 132 on a carrier frequency $f_c$ to generate a signal y(t) which is transmitted to the receiver 108.

At the receiver, a modified version of the signal y(t) is received. For example, the signal y(t) may be modified due to, for example, multipath interference, additive noise, etc. The receiver includes an RF demodulator 150 coupled to an analog-to-digital converter (ADC) 154. The RF demodulator 150 ideally demodulates the received signal by shifting the received signal by exactly $f_c$. In reality, however, the demodulator 150 typically shifts the received signal by a frequency $f_c'$ which is slightly different than $f_c$, resulting in a frequency offset, $\Delta f_c = f_c - f_c'$.

The ADC 154 samples the demodulated received signal. Ideally, the ADC 154 samples the received signal at exactly the same sampling period T corresponding to the DAC 132. In reality, however, the sampling period T' of the ADC 154 is slightly different from T, resulting in an offset, $\Delta T = T' - T$. The output of the DAC 132 is a signal $\hat{y}(n)$.

A timing and frequency correction block 158 is coupled to the DAC 132. The timing and frequency correction block 158 processes the signal $\hat{y}(n)$ to compensate for the carrier frequency offset $\Delta f_c$ and the sampling period offset $\Delta T$. In some prior art systems, estimates of the frequency offset $\Delta f_c$ and the sampling period offset $\Delta T$ are provided to the timing and frequency correction block 158 by a carrier frequency offset estimator 162 and a sampling period offset estimator 166, respectively. The output of the timing and frequency correction block 158 includes a signal $\hat{x}(n)$ that corresponds to the signal x(n) in the transmitter 104. The output of the timing and frequency correction block 158 may also include a signal corresponding to the guard interval inserted by the transmitter 104.

The carrier frequency offset estimator 162 is coupled to the timing and frequency correction block 158. The carrier frequency offset estimator 162 estimates $\Delta f_c$ based on the signal $\hat{x}(n)$ and the signal corresponding to the guard interval. The carrier frequency offset estimator 162 estimates $\Delta f_c$ by calculating a phase difference between a sample of the cyclic prefix and the corresponding sample in the OFDM symbol. In particular, the carrier frequency offset estimator 162 estimates $\Delta f_c$ based on the following equation:

$$\Delta f_c = \frac{\phi_{n+F} - \phi_n}{2\pi FT} \quad \text{Eq. 1}$$

where $\phi_n$ is a phase of a sample in the cyclic prefix and $\phi_{n+F}$ is a phase of a sample in the OFDM symbol that corresponds to the sample in the cyclic prefix. The carrier frequency offset estimator 162 provides the estimate of $\Delta f_c$ to the timing and frequency correction block 158.

A fast Fourier transform (FFT) block 170 is coupled to the timing and frequency correction block 158. The FFT block 170 performs an FFT operation on a set of N samples of the signal $\hat{x}(n)$ corresponding to an OFDM symbol and, optionally, on the corresponding cyclic prefix. The FFT block 170 generates a set of N signals $\hat{X}_0(k), \hat{X}_1(k), \ldots, \hat{X}_{N-1}(k)$ that correspond to the N signals $X_0(k), X_1(k), \ldots, X_{N-1}(k)$ generated at the transmitter 104. The N signals generated by the FFT block 170 may include $N_v$ QAM modulated signals (corresponding to the output of the QAM modulator 120 at the transmitter 104) and other signals such as pilot signals and transmit parameter signals, for example.

The sampling period offset estimator 166 is coupled to the FFT block 170. The sampling period offset estimator 166 estimates $\Delta T$ based on one or more of the signals $\hat{X}_0(k), \hat{X}_1(k), \ldots, \hat{X}_{N-1}(k)$. The sampling period offset estimator 166 estimates $\Delta T$ by calculating a phase difference between a pilot corresponding to a first OFDM symbol and the same pilot, but corresponding to a second OFDM symbol. In particular, the sampling period offset estimator 166 estimates $\Delta T$ based on the following equation:

$$\Delta T = \frac{\Phi_{k,m+F+G} - \Phi_{k,m}}{2\pi k(F+G)} FT \quad \text{Eq. 2}$$

where $\Phi_{k,m}$ is a phase of a pilot, where k is an index indicating the frequency of the pilot, where m is an index indicating the OFDM symbol to which the pilot phase $\Phi_{k,m}$ corresponds, where $\Phi_{k,m+F+G}$ is the phase of the same pilot but in the next OFDM symbol. The sampling period offset estimator 166 provides the estimate of $\Delta T$ to the timing and frequency correction block 158.

A demodulator 174 receives the $N_V$ QAM modulated signals from the FFT block 170 and demodulates each of the $N_V$ signals to generate an information signal $\hat{s}(i)$ that corresponds to the information signal $s(i)$ at the transmitter. The demodulator 174 may comprise $N_V$ parallel QAM demodulators and a demultiplexer that generates the serial information signal $\hat{s}(i)$ from the $N_V$ parallel demodulators in a manner that generally corresponds to the reverse operation of the modulator 120.

SUMMARY OF THE DISCLOSURE

In one embodiment, a method for determining timing information in a receiver includes receiving at the receiver a modulated signal and demodulating the modulated signal using a demodulator of the receiver to produce a demodulated signal. The method also includes converting the demodulated signal to a digital signal using an analog-to-digital converter and producing from the digital signal a first signal and a second signal. The method further includes analyzing the first signal to determine a first phase difference with respect to different portions of the first signal and analyzing the second signal to determine a second phase difference with respect to different portions of the second signal. The second signal is a frequency domain representation of at least a portion of the first signal. The method also includes generating a joint estimate of a sampling period offset and a carrier frequency offset based on the first phase difference and the second phase difference. In embodiments of the method, generating the joint estimate of the sampling period offset includes generating at least one of i) an estimate of a receiver sampling period offset, ii) an estimate of a receiver sampling period, iii) an estimate of a receiver sampling frequency offset, iv) an estimate of a receiver sampling frequency, or v) an estimate of a transmitter sampling frequency.

In embodiments of the method, the first signal is an orthogonal frequency-division multiplexing (OFDM) signal demodulated from a radio frequency carrier. In some of these embodiments, analyzing the first signal to determine the first phase difference includes determine a phase difference with respect to a sample in a cyclic prefix and a corresponding sample in an OFDM symbol. Analyzing the second signal to determine the second phase difference includes determining a phase difference with respect to a pilot signal in the OFDM symbol and a pilot signal in another OFDM symbol, in some embodiments and, optionally, may include determining respective phase differences with respect to a plurality of pilot signals in the OFDM symbol and a plurality of pilot signals in another OFDM symbol.

In another embodiment, a receiver includes a demodulator, an analog-to-digital converter, a carrier frequency offset and sampling period offset corrector, and a joint carrier frequency offset and sampling period offset estimator. In embodiments, the joint carrier frequency offset and sampling period offset estimator includes a first phase difference calculator configured to calculate a first phase difference with respect to different portions of a first signal, a second phase difference calculator configured to calculate a second phase difference with respect to different portions of a second signal wherein the second signal is a frequency domain representation of at least a portion of the first signal, and an estimate calculator configured to generate a joint estimate of a sampling period offset and a carrier frequency offset based on the first phase difference and the second phase difference.

DETAILED DESCRIPTION

The phase difference between a sample of the cyclic prefix and the corresponding sample in the OFDM symbol discussed above with respect to Eq. 1 is caused by both the carrier frequency offset $\Delta f_c$ and the sampling period offset $\Delta T$. In particular, this dependency can be represented by the following equation:

$$\Delta \phi_n = \phi_{n+F} - \phi_n = 2\pi \Delta f c_n FT' \quad \text{Eq. 3}$$

where $\phi_n$ is a phase of a sample in the cyclic prefix, $\phi_{n+F}$ is a phase of a sample in the OFDM symbol that corresponds to the sample in the cyclic prefix, $\Delta\phi_n$ is phase difference between the two samples, and T' is the sampling period of the receiver ADC 154 (i.e., $\Delta T+T$). Additionally, the phase difference between a pilot in a first OFDM symbol and the same pilot in an adjacent second OFDM symbol discussed above with respect to Eq. 2 is also caused by both the carrier frequency offset $\Delta f_c$ and the sampling period offset $\Delta T$. In particular, this dependency can be represented by the following equation:

$$\Delta\Phi_k = \Phi_{k,m+F+G} - \Phi_{k,m} = 2\pi\left[k\left(\frac{T'}{T}-1\right)+\Delta fcFT'\right]\frac{F+G}{F} \qquad \text{Eq. 4}$$

where $\Phi_{k,m}$ is a phase of the pilot, where k is an index indicating the frequency of the pilot, where m is an index indicating the OFDM symbol to which the pilot phase $\Phi_{k,m}$ corresponds, where $\Phi_{k,m+F+G}$ is the phase of the same pilot but in the next OFDM symbol.

Using Equations 3 and 4 to solve for the carrier frequency offset $\Delta f_c$ and the sampling period offset $\Delta T$ results in:

$$\Delta T = \left[(\Phi_{k,m+F+G}-\Phi_{k,m})\frac{F}{F+G}-(\phi_{n+F}-\phi_n)\right]\frac{T}{2\pi k} \qquad \text{Eq. 5}$$

$$\Delta f_c = \frac{k(F+G)(\phi_{n+N}-\phi_n)}{[(\Phi_{k,m+F+G}-\Phi_{k,m})F-(\phi_{n+F}-\phi_n)(F+G)+2\pi k(F+G)]FT} \qquad \text{Eq. 6}$$

Thus, the carrier frequency offset $\Delta f_c$ can be estimated based on both $\phi_{n+F}-\phi_n$ and $\Phi_{k,m+F+G}-\Phi_{k,m}$. Similarly, the sampling period offset $\Delta T$ can be estimated based on both $\Phi_{n+F}-\phi_n$ and $\Phi_{k,m+F+G}-\Phi_{k,m}$. Calculating estimates of the carrier frequency offset $\Delta f_c$ and the sampling period offset $\Delta T$ according to Equations 5 and 6 generally provides better estimates as compared to the techniques that calculate estimates according to the Equations 1 and 2.

Figure 1:
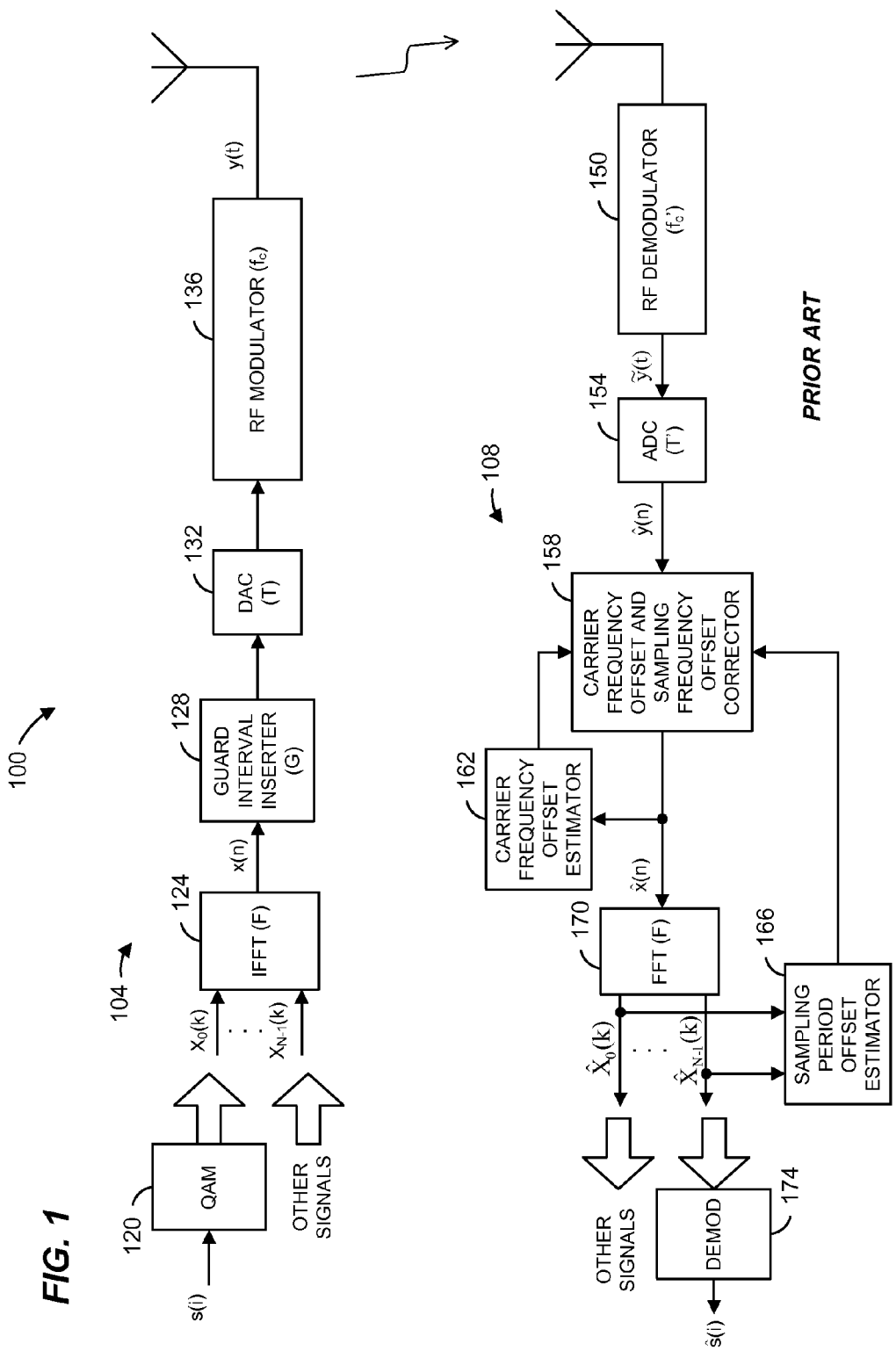
FIG. 1 a block diagram of a prior art digital video broadcasting (DVB) system.
Figure 2:
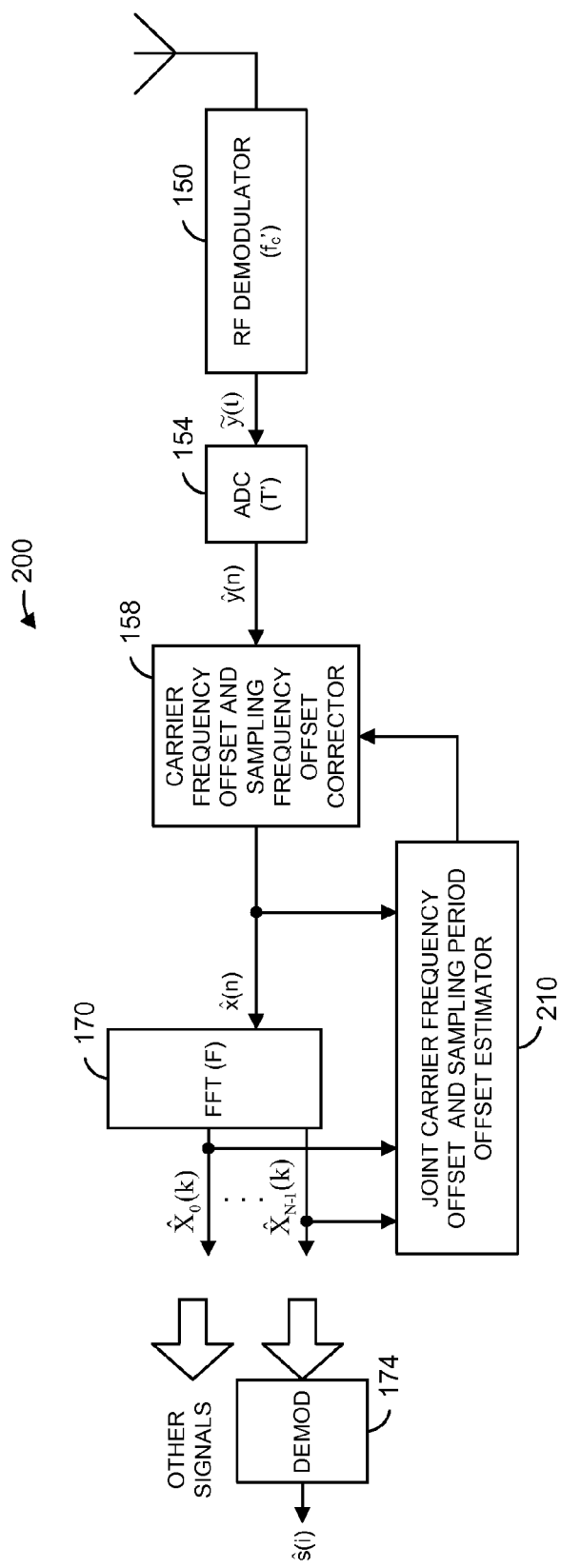
FIG. 2 is a block diagram of an example DVB receiver.

FIG. 2 is a block diagram of another example DVB receiver 200 that includes blocks similar to those of the receiver 108 in FIG. 1, and these blocks are like-numbered. The receiver 200 includes a joint carrier frequency offset and sampling period offset estimator 210 coupled to the ADC 154, the timing and frequency correction block 158 and the FFT block 170. The joint carrier frequency offset and sampling period offset estimator 210 estimates both $\Delta T$ and $\Delta f_c$ based on the signal $\hat{x}(n)$, the signal corresponding to the guard interval, and one or more of the signals $\hat{X}_0(k), \hat{X}_1(k), \ldots, \hat{X}_{N_v-1}(k)$. More specifically, the carrier frequency offset and sampling period offset estimator 210 calculates a phase difference $(\phi_{n+F}-\phi_n)$ between a sample of the cyclic prefix and the corresponding sample in the OFDM symbol based on the signal $\hat{x}(n)$ and the signal corresponding to the guard interval. Additionally, it calculates a phase difference $(\Phi_{k,m+F+G}-\Phi_{k,m})$ between a pilot corresponding to a first OFDM symbol and the same pilot, but corresponding to a second OFDM symbol, based on one or more of the signals $\hat{X}_0(k), \hat{X}_1(k), \ldots, \hat{X}_{N-1}(k)$. Based on these calculated phase differences, the joint carrier frequency offset and sampling period offset estimator 210 then calculates an estimate of $\Delta T$ and $\Delta f_c$.

The estimates of $\Delta T$ and $\Delta f_c$ are provided to the timing and frequency correction block 158. Optionally, the carrier frequency offset estimate $\Delta f_c$ may be provided to the RF demodulator 150 so that the RF demodulator 150 can adjust for the offset. Optionally, the sampling period offset estimate $\Delta T$ may be provided to the ADC 154 so that it can adjust its sampling frequency.

According to embodiments of the methods and systems described herein, a system of equations that can be used to estimate and/or determine both the carrier frequency offset $\Delta f_c$ and the sampling period offset $\Delta T$. In embodiments, the system of equations is solved simultaneously without assuming that T'=T (i.e., without assuming $\Delta T=0$), without assuming that $f_c'=f_c$ (i.e., without assuming $\Delta f_c=0$), or both.

In embodiments, a vector, $v_n$, is defined as a function of the sample phase difference $\Delta\phi_n$ expressed according to the equation $$v_n = A_n e^{j\Delta\phi_n} \qquad \text{Eq. 7}$$

where $A_n$ is a weighting coefficient. Averaging the vectors yields an average vector, v, which may also be expressed as a function of the average sample phase difference, $\Delta\phi$, according to the equation $$v = \frac{1}{N}\sum_{n=0}^{N-1} v_n = Ae^{j\Delta\phi} \qquad \text{Eq. 8}$$

where N is the total number of samples used. Of course, the average sample phase difference, $\Delta\phi$, can be calculated according to the equation $$\Delta\phi = \arctan\left(\frac{\text{Im}(v)}{\text{Re}(v)}\right). \qquad \text{Eq. 8.1}$$

In embodiments, the pilot phase difference is expressed in terms of the weighted average sample phase difference, $\Delta\phi$, according to the equation $$\Delta\Theta_k = 2\pi\left(\frac{T'}{T}-1\right) = \frac{\Delta\Phi_k \frac{F}{F+G}-\Delta\phi}{k} \qquad \text{Eq. 9}$$

where F is the size of the FFT, G is the size of the guard interval, and k is the pilot index in frequency.

Using the pilot phase difference $\Delta\Theta_k$, a vector, V, is in some embodiments defined as a function of the pilot phase difference according to the equation $$V_k = A_k e^{j\Delta\Theta_k} \qquad \text{Eq. 10}$$

where $A_k$ is a weighting coefficient. Averaging the vectors $V_k$ yields an average vector, V, which may also be expressed as a function of the average pilot phase difference, $\Delta\Theta$, according to the equation $$V = \frac{1}{K}\sum_{k=k_1}^{k_K} V_k = Ae^{j\Delta\Theta} \qquad \text{Eq. 11}$$

where K is the total number of pilots used. Of course, the average pilot phase difference, $\Delta\Theta$, can be calculated according to the equation $$\Delta\Theta = \arctan\left(\frac{\text{Im}(V)}{\text{Re}(V)}\right), \quad \text{Eq. 11.1}$$

which can be approximated in implementation as $$\Delta\Theta \approx \frac{\text{Im}(V)}{\text{Re}(V) + \text{Im}(V)}. \quad \text{Eq. 11.2}$$

Having determined values of $\Delta\Theta$ and $\Delta\phi$, the following equations can be solved jointly to determine T' (and, accordingly, $\Delta T$) and $\Delta fc$:

$$\Delta\phi = 2\pi\Delta fc FT' \quad \text{Eq. 12}$$

$$\Delta\Theta = 2\pi\left(\frac{T'}{T} - 1\right). \quad \text{Eq. 13}$$

Figure 3:
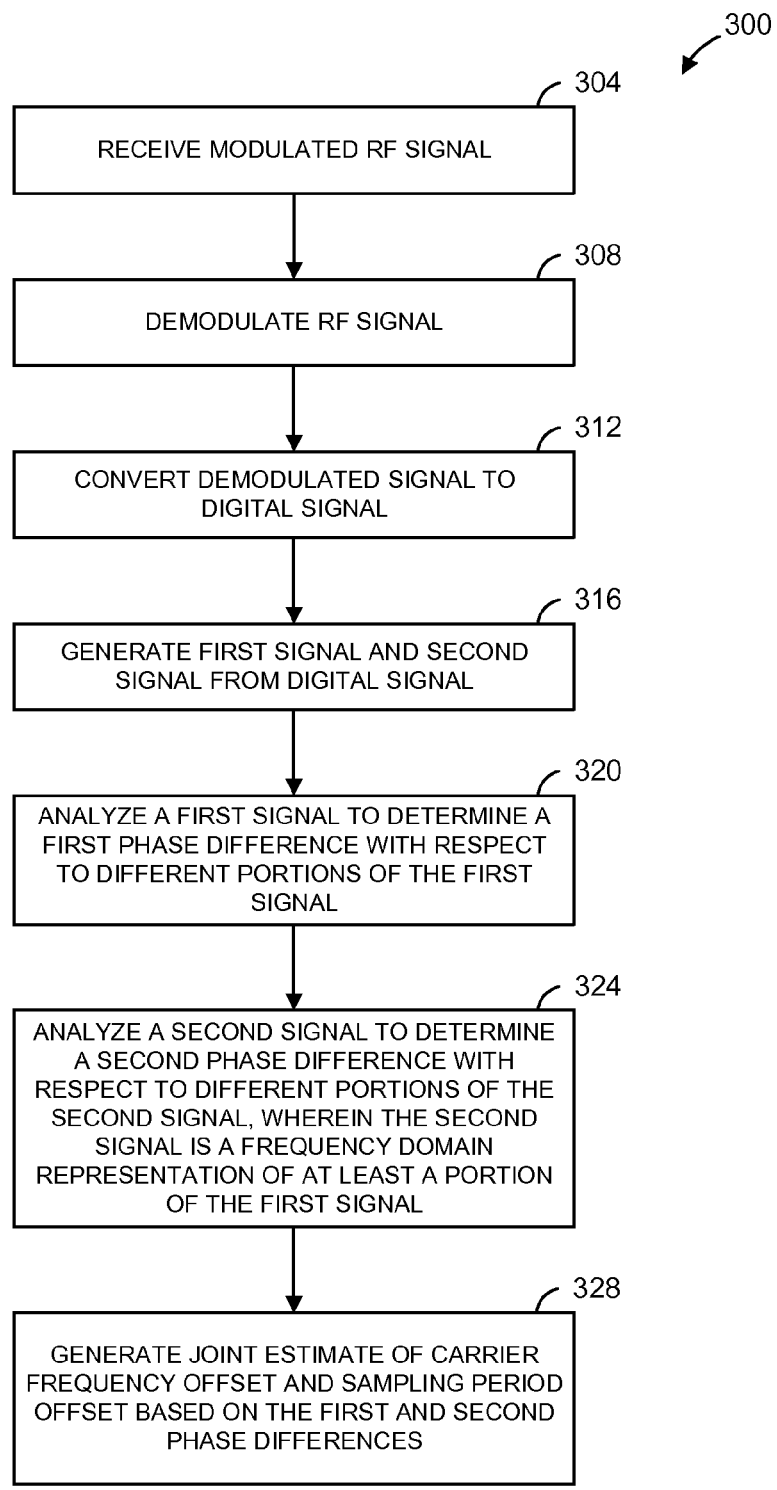
FIG. 3 is a flow diagram of an example method for determining estimates of a sampling period offset and a carrier frequency offset.

FIG. 3 is a flow diagram of an example method 300 that may be implemented by the receiver 200 and, in part, by the joint carrier frequency offset and sampling period offset estimator 210 of FIG. 2. The method 300 will be described with reference to FIG. 2 for ease of explanation. Of course, one of ordinary skill in the art will recognize that the method 300 may be implemented in other systems as well. Similarly, one of ordinary skill in the art will recognize that the joint carrier frequency offset and sampling period offset estimator 210 may implement a method different than the method 300.

At 304, the receiver 200 and, in particular, the RF demodulator 150, receives a modulated RF signal, and, at 308, demodulates the RF signal, producing an output signal ỹ(t). At 312, the ADC 154 receives the signal ỹ(t) and samples the signal at a sample period T' to produce a digital signal ŷ(n). First and second signals are generated at 316 from the digital signal ŷ(n).

In embodiments, the joint carrier frequency offset and sampling period offset estimator 210 analyzes the first signal at 320 to determine a first phase difference with respect to different portions of the first signal. In embodiments, the carrier frequency offset and sampling frequency offset corrector 158 analyzes the signal ŷ(n) generated by the ADC 154 to determine an OFDM symbol x̂(n). A phase difference calculator may determine a phase difference $\phi_{n+F}-\phi_n$ between a sample of the cyclic prefix and the corresponding sample in the OFDM symbol. With respect to the receiver 200, the first signal may comprise the OFDM symbol signal x̂(n) and the signal corresponding to the guard interval.

In embodiments, the joint carrier frequency offset and sampling period offset estimator 210 analyzes the second signal at 324 to determine a second phase difference with respect to different portions of the second signal. The second signal may be a frequency domain representation of at least a portion of the first signal. In the receiver 200, the second signal may comprise at least some of the outputs of the FFT block 170 (i.e., at least some of the signals $\hat{X}_0(k), \hat{X}_1(k), \ldots, \hat{X}_{N-1}(k)$). With respect to the receiver 200, at least some of the signals $\hat{X}_0(k), \hat{X}_1(k), \ldots, \hat{X}_{N-1}(k)$ may be analyzed to determine a phase difference $\Phi_{k,m+F+G}-\Phi_{k,m}$ between a pilot corresponding to a first OFDM symbol and the same pilot, but corresponding to a second OFDM symbol.

At 328, a joint estimate of the carrier frequency offset $\Delta f_c$ and the sampling period offset $\Delta T$ are generated based on the first phase difference calculated at 320 and the second phase difference calculated at 324. Generating the joint estimate of the carrier frequency offset $\Delta f_c$ and the sampling period offset $\Delta T$ may comprise generating the joint estimate according to the Equations 7-13, for example.

Figure 4:
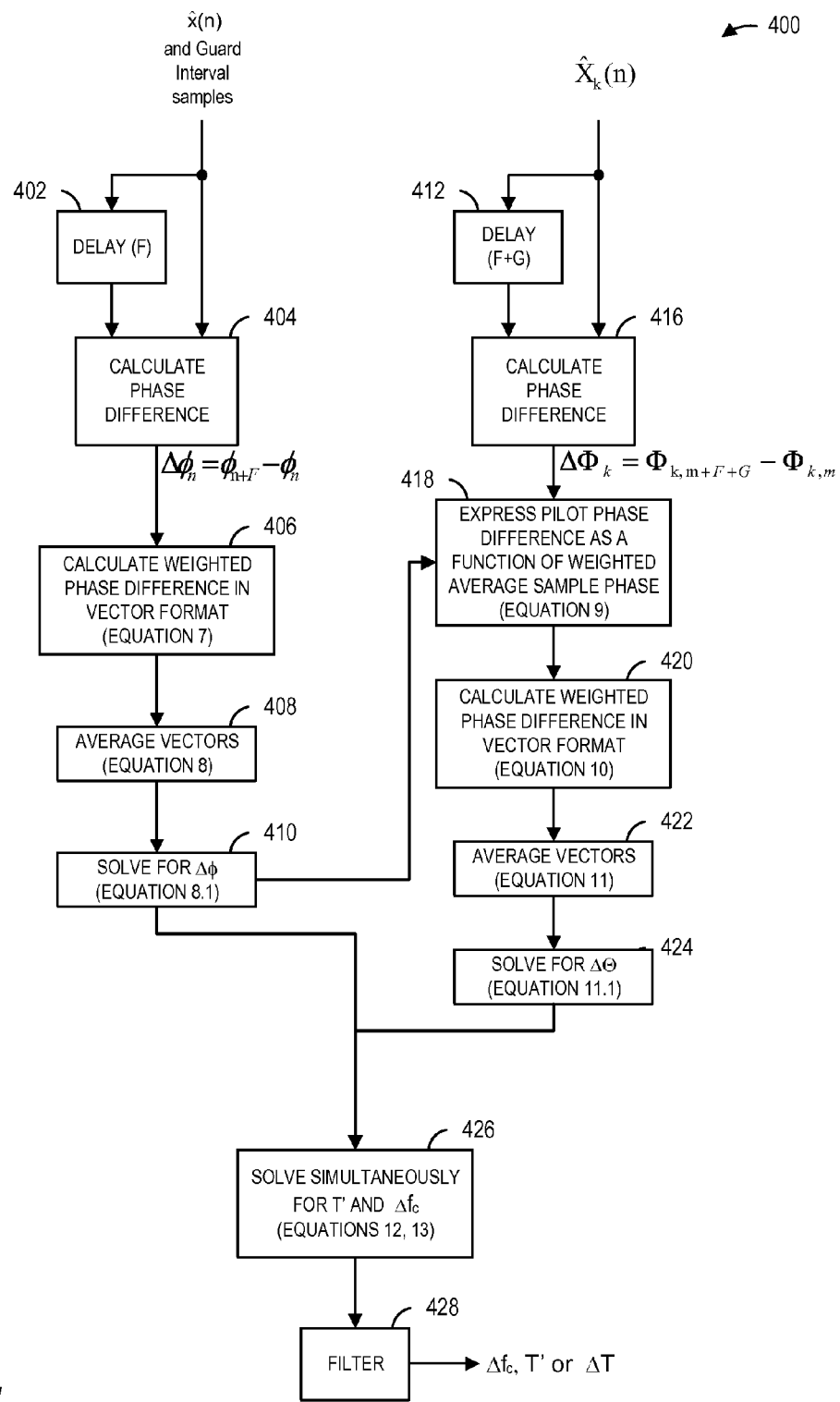
FIG. 4 is a block diagram of an example carrier frequency offset and sampling period offset estimator that may be utilized in the receiver of FIG. 2.

FIG. 4 is a block diagram of an example joint carrier frequency offset and sampling period offset estimator 400. The joint carrier frequency offset and sampling period offset estimator 210 of FIG. 2 may comprise the estimator 400 of FIG. 4, and the block diagram of FIG. 4 will be described with reference to FIG. 2 for ease of explanation. Of course, one of ordinary skill in the art will recognize that the estimator 400 may be implemented in other systems as well. Similarly, one of ordinary skill in the art will recognize that the joint carrier frequency offset and sampling period offset estimator 210 need not comprise the estimator 400, and may additionally or alternatively comprise other estimators. The estimator 400 may implement the method 300 of FIG. 3. Of course, one of ordinary skill in the art will recognize that the method 300 may be implemented by other systems as well.

The joint carrier frequency offset and sampling period offset estimator 400 comprises a delay element 402 that receives the OFDM symbol signal x̂(n) and the signal corresponding to the guard interval. The delay element 404 implements a delay equal to the OFDM symbol length, and this delay length is indicated in FIG. 4 as F. A phase difference calculator 404 is coupled to the delay element 402, and the calculator 404 also receives the OFDM symbol signal x̂(n) and the signal corresponding to the guard interval. The phase difference calculator 404 is configured to calculate phase differences ($\Delta\phi_n = \phi_{n+F}-\phi_n$) between samples of the cyclic prefix and the corresponding samples in the OFDM symbol.

The joint carrier frequency offset and sampling period offset estimator 400 also comprises a delay element 412 that receives at least some of the outputs generated by the FFT block 170. The delay element 412 implements a delay equal to the OFDM symbol length plus the guard interval length, and this delay length is indicated in FIG. 4 as F+G. A phase difference calculator 416 is coupled to the delay element 412, and the calculator 416 also receives at least some of the outputs generated by the FFT block 170. The phase difference calculator 416 is configured to calculate phase differences ($\Delta\Phi_k = \Phi_{k,m+F+G}-\Phi_{k,m}$) between pilots corresponding to a first OFDM symbol and the same pilots, but corresponding to a second OFDM symbol. If there a multiple pilots utilized, the calculator 416 may calculate multiple phase differences per OFDM symbol.

A module 406 may receive the phase differences $\Delta\phi_n$ and calculate weighted phase difference vectors, $v_n$, according to Equation 7. The vectors $v_n$ are received by a module 408 that averages a number, N, of phase differences $v_n$, according to Equation 8, to arrive at an average weighted phase difference vector, v. A module 410 receives the vector v and calculates the average sample phase difference, $\Delta\phi$, according to Equation 8.1.

A module 418 receives the phase differences, $\Delta\Phi_k$, from the calculator 416 and receives the average sample phase difference, $\Delta\phi$, from the module 410. The module 418 calculates pilot phase differences, $\Delta\Theta_k$, according to Equation 9. A module 420 receives the pilot phase differences, $\Delta\Theta_k$, and calculates weighted phase difference vectors, $V_k$, according to Equation 10. The vectors $V_k$ are received by a module 422 that averages a number, K, of phase differences $V_k$, according to Equation 11, to arrive at an average weighted phase difference vector, V. A module 424 receives the vector V and calculates the average sample phase difference, $\Delta\Theta$, according to Equation 11.1.

A solver module 426 receives the values Δϕ and ΔΘ from the modules 410 and 424, respectively, and solves for Δfc and ΔT (or T', from which ΔT may be calculated) according to the Equations 12 and 13. One or more filters 428 optionally may be coupled to the solver module 426 and may filter the output solver module 426. For example, each of the filters 428 may implement a low-pass filter, or some other suitable filter, on the output of the solver module 426. In particular embodiments, the filters 428 include one or more of a low pass filter on the output T', a low pass filter on the output (T'/T), a low pass filter on the output ((T'−T)/T), and/or a low pass filter on the value Δfc.

One of ordinary skill in the art will recognize many variations to the above-described apparatus and methods. As just one example, the frequency $f_c'$ may be calculated at the receiver in addition to or instead of $\Delta f_c$. Similarly, the sampling period T' may be calculated in addition to or instead of ΔT. Additionally, a sampling frequency or sampling frequency offset may be calculated instead of a sampling period or sampling period offset.

The technique described above may be used to a calculate a sampling period and frequency offsets with respect to a transmitter sampling period and a transmitter frequency or with respect to a previously used receiver sampling period and a previously used receiver frequency. When calculating offsets with respect to previously used receiver values, the value T in equations 5 and 6 may be the previously used receiver sampling period.

Figure 5:
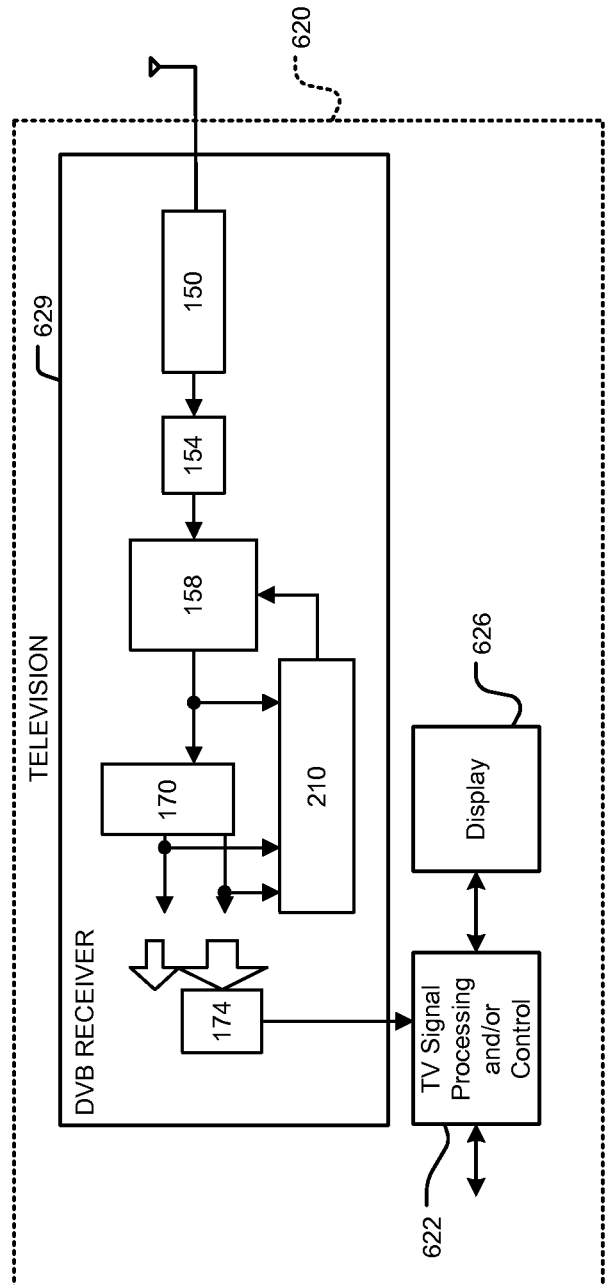
FIG. 5 is a block diagram of a television implementing a DVB receiver using a joint carrier frequency offset and sampling period offset estimator.

The presently described techniques can be utilized in DVB communication systems including, for example, a television configured to receive a DVB broadcast. FIG. 5 is a block diagram of a television 620 configured with a DVB receiver. The television 620 includes signal processing and/or control circuits 622 receiving a signal from a DVB receiver 629 according to the presently described embodiments. A display 626 coupled to the signal processing and control circuitry 629 is configured to display a video signal output by the signal processing and control circuitry 629. The joint carrier frequency offset and sampling period offset estimation techniques described herein are utilized in the DVB receiver 629. The television 620 receives input signals in either a wired or wireless format. The DVB receiver 629 receives the modulated input signals, demodulates them, and converts them to a digital signal in the analog to digital converter. The joint carrier frequency offset and sampling period offset estimator receives signals in the time and frequency domains and estimates the carrier frequency and sampling period offsets between the transmitter and the receiver 629 according to the methods described above. The estimated offsets are used to correct the received signal. The signals are demodulated and transmitted to the signal processing and control block 622, which generates output signals for the display 626. The signal processing circuit and/or control circuit 622 and/or other circuits (not shown) of television 620 may process data, perform coding and/or encryption, perform calculations, format data and/or perform any other type of processing required.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for determining timing information in a receiver, the method comprising:
   receiving at the receiver modulated signal;
   demodulating the modulated signal using a demodulator of the receiver to produce a demodulated signal;
   converting the demodulated signal to a digital signal using an analog-to-digital converter (ADC);
   producing from the digital signal a first signal and a second signal;
   analyzing the first signal to determine a first phase difference with respect to different portions of the first signal;
   analyzing the second signal to determine a second phase difference with respect to different portions of the second signal, wherein the second signal is a frequency domain representation of at least a portion of the first signal; and
   generating a joint estimate of a sampling period offset and a carrier frequency offset based on the first phase difference and the second phase difference;
   wherein generating the joint estimate of the sampling period offset and the carrier frequency offset comprises calculating a vector representing a weighted first phase difference according to the equation $$v_n = A_n e^{j\Delta\phi_n}$$

where n is a sample index, $v_n$ is the vector corresponding to the sample index n, $A_n$ is a weight coefficient corresponding to the sample index n, and $\Delta\phi_n$ represents the phase difference between a sample of a cyclic prefix and a corresponding sample in an orthogonal frequency-division multiplexing (OFDM) symbol in the first signal.

2. The method according to claim 1, wherein generating the joint estimate of the sampling period offset comprises generating at least one of i) an estimate of a receiver sampling period offset, ii) an estimate of a receiver sampling period, iii) an estimate of a receiver sampling frequency offset, iv) an estimate of a receiver sampling frequency, or v) an estimate of a transmitter sampling frequency.

3. The method according to claim 1, wherein the first signal comprises an orthogonal frequency-division multiplexing (OFDM) signal demodulated from a radio frequency carrier.

4. The method according to claim 3, wherein analyzing the first signal to determine the first phase difference includes determining a phase difference with respect to a sample in the cyclic prefix and the corresponding sample in the OFDM symbol.

5. The method according to claim 4, wherein analyzing the second signal to determine the second phase difference includes determining a phase difference with respect to a pilot signal in the OFDM symbol and a pilot signal in another OFDM symbol.

6. The method according to claim 5, wherein analyzing the second signal to determine the second phase difference includes determining respective phase differences with respect to a plurality of pilot signals in the OFDM symbol and a plurality of pilot signals in another OFDM symbol.

7. The method according to claim 1, further comprising calculating an average weighted first phase difference vector according to the equation $$v = \frac{1}{N} \sum_{n=0}^{N-1} v_n$$

where v is the vector corresponding to the average weighted first phase difference and N is the total number of samples used.

8. The method according to claim 5, wherein generating the joint estimate of the sampling period offset and the carrier frequency offset further comprises calculating a vector representing a weighted second phase difference.

9. The method according to claim 8, wherein calculating the vector representing the weighted second phase difference comprises calculating the vector according to the equation $$V_k = A_k e^{j\Delta\Theta_k}$$

where k is a pilot index, $V_k$ is the vector corresponding to the pilot index k, $A_k$ is a weight coefficient corresponding to the pilot index k, and $\Delta\Theta_k$ is a pilot phase difference expressed in terms of a weighted average sample phase difference.

10. The method according to claim 9, further comprising calculating an average weighted second phase difference according to the equation $$V = \frac{1}{K} \sum_{k=k_1}^{k_k} A_k e^{j\Delta\Theta_k}$$

where V is the vector corresponding to the average weighted second phase difference and K is the total number of pilots used.

11. The method according to claim 10, wherein $\Delta\Theta_k$ is expressed as $$\Delta\Theta_k = \frac{\Delta\Phi_k \frac{F}{F+G} - \Delta\phi}{k}$$

where $\Delta\Phi_k$ represents the phase difference between a pilot in a first OFDM symbol and the same pilot in an adjacent second ODFM symbol, F is a size of an FFT and G is a size of a guard interval.

12. The method according to claim 1, wherein generating the joint estimate of the sampling period offset and the carrier frequency offset comprises estimating the sampling period offset and the carrier frequency offset without assuming that there is no sampling period offset and without assuming that there is no carrier frequency offset.

13. A receiver comprising:
a demodulator;
an analog-to-digital converter (ADC);
a carrier frequency offset and sampling period offset corrector; and
a joint carrier frequency offset and sampling period offset estimator;
wherein the joint carrier frequency offset and sampling period estimator comprises:
a first phase difference calculator configured to calculate a first phase difference with respect to different portions of a first signal;
a second phase difference calculator configured to calculate a second phase difference with respect to different portions of a second signal, wherein the second signal is a frequency domain representation of at least a portion of the first signal; and
an estimate calculator configured to generate a joint estimate of a sampling period offset and a carrier frequency offset based on the first phase difference and the second phase difference; and
wherein the estimate calculator comprises a module configured to calculate a vector representing a weighted first phase difference according to the equation $$v_n = A_n e^{j\Delta\phi_n}$$

where n is a sample index, $v_n$ is the vector corresponding to the sample index n, $A_n$ is a weight coefficient corresponding to the sample index n, and $\Delta\phi_n$ represents the phase difference between a sample of a cyclic prefix and a corresponding sample in an orthogonal frequency-division multiplexing (OFDM) symbol in the first signal.

14. The receiver according to claim 13, wherein the estimate calculator further comprises a module configured to calculate a vector representing a weighted second phase difference.

15. The receiver according to claim 14, wherein the module configured to calculate the vector representing the weighted second phase difference is configured to calculate the vector according to the equation $$V_k = A_k e^{j\Delta\Theta_k}$$

where k is a pilot index, $V_k$ is the vector corresponding to the pilot index k, $A_k$ is a weight coefficient corresponding to the pilot index k, and $\Delta\Theta_k$ is a pilot phase difference expressed in terms of a weighted average sample phase difference.

* * * * *